United States Patent [19]

Mizukawa

[11] Patent Number: 5,721,973
[45] Date of Patent: Feb. 24, 1998

[54] DUAL-FOCUS CHANGE-OVER CAMERA

[75] Inventor: Shigeo Mizukawa, Omiya, Japan

[73] Assignee: Fuji Photo Optical Co., Ltd., Omiya, Japan

[21] Appl. No.: 743,356

[22] Filed: Nov. 4, 1996

[30] Foreign Application Priority Data

Nov. 7, 1995 [JP] Japan .................................. 7-313505

[51] Int. Cl.$^6$ .......................... G03B 3/00; G03B 9/10; G03B 13/12
[52] U.S. Cl. ...................... 396/73; 396/84; 396/88; 396/352; 396/378; 396/493
[58] Field of Search .......................... 396/84, 72, 73, 396/88, 351, 352, 471, 493, 494, 495, 496, 89, 378, 380

[56] References Cited

U.S. PATENT DOCUMENTS

| 2,187,246 | 1/1940 | Nerwin | 396/380 |
| 4,772,903 | 9/1988 | Labaziewicz | 396/84 |
| 4,801,958 | 1/1989 | Stoneham | 396/73 |
| 4,973,997 | 11/1990 | Harvey | 396/380 X |
| 5,313,239 | 5/1994 | Mizukawa | 396/471 |

Primary Examiner—W. B. Perkey
Attorney, Agent, or Firm—Ronald R. Snider

[57] ABSTRACT

The dual-focus change-over camera provides a camera which allows telescope or wide angle photographing with a simple arrangement, and which is inexpensive, small size, and light weighted. The camera comprises a finder change-over member arranged to be movable for establishing two finder openings for different focal distance, a telescope lens and a standard lens for performing photographing with two focal distance, a fixed mirror for reflecting image light from the telescope lens, and a movable mirror movable between a first position (telescope position) for directing the image light from reflected by the fixed mirror to a film and a second position (standard position) for directing the image light from the other standard lens to the film. Then, the movable mirror is rotated to the first or second position in interlocking with the sliding operation of the finder change-over member. Thus, dual-focus photographing such as telescoping and standard photographing, or standard and closed photographing can be attained with a simple arrangement.

9 Claims, 4 Drawing Sheets

FIG. 6(A) FIG. 6(B)
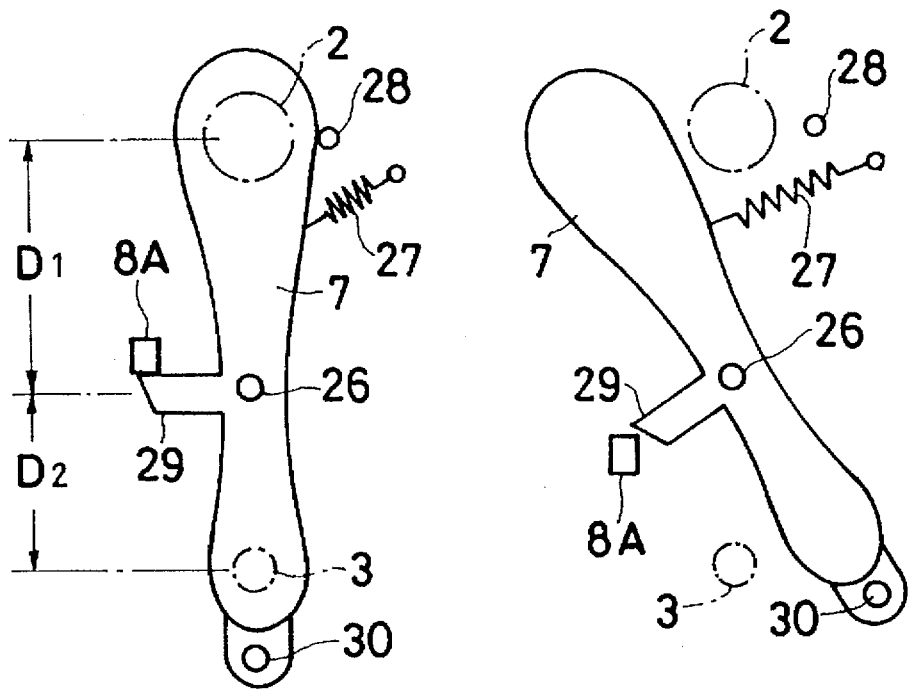
FIG. 7(A) FIG. 7(B)
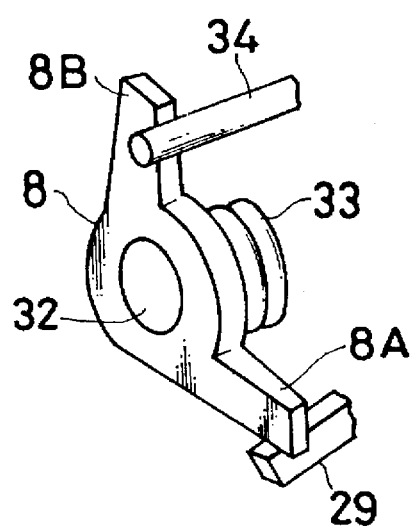 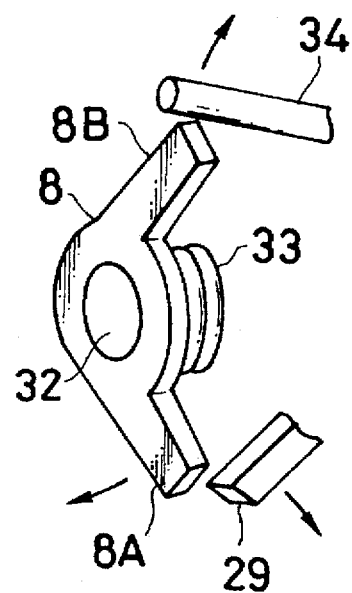

DUAL-FOCUS CHANGE-OVER CAMERA

BACKGROUND OF THE INVENTION

This application claims the priority of Japanese Patent Application No. 7-313505, filed on Nov. 7, 1995 which is incorporated herein by reference.

1. Field of the Invention

The present invention relates to a dual-focus change-over camera having two shooting lens sections, which is used in a simple camera such as a lens-fitted photographic film unit.

2. Description of the Prior Art

A simple camera such as a lens-fitted photographic film unit the shooting lens of which is integrally built in its body is known. The lens-fitted photographic film unit is widely used because it has various advantages such as inexpensive, small size, light-weighted and easy to carry about. Such simple camera includes various types for panorama photographing, stereo photographing, wide angle photographing in addition to standard photographing.

SUMMARY OF THE INVENTION

There is no simple camera such as the lens-fitted photographic film unit which also has functions for telescope and standard or wide angle photographing with one unit. If such functions are provided, it is convenient. However, if the telescope and standard or wide angle photographing members conventionally existing for a compact camera or the like are simply mounted on the lens-fitted photographic film unit, arrangement of components becomes too complicated, so that the advantages of inexpensive, small size and light-weighted are lost.

The present invention is made in view of the above, and intended to provide a dual-focus change-over camera which allows telescope photographing and standard or wide-angle photographing with a simple arrangement, and which is inexpensive, small size and light-weighted.

To attain the above object, the dual-focus change-over camera according to the present invention comprises a finder change-over mechanism for establishing a dual-focus finder opening for dual-focusing, two lens shooting lens sections for dual-focusing, a fixed mirror for reflecting light from one shooting lens section of the dual-focus shooting lens section, and a movable mirror movable between a first position for directing the image light reflected by the fixed mirror to a film, and a second position for directing image light from the other shooting lens section to the film. The combination of the dual-focus may include a combination for telescope and standard photographing, and for standard and wide angle (closed) photographing.

Another aspect of the present invention further comprises an interlock mechanism for moving the movable mirror between the first position and the second position in interlocking with the finder change-over mechanism.

In still another aspect of the present invention, shutters of the two shooting lens sections for dual-focusing are coupled to constitute one shutter blade, the coupled shutter blade being rotated around a shaft for shutter operation. This simplifies the arrangement of the camera. The coupled shutter blade may be provided with weight for adjusting balance.

The finder change-over mechanism includes a finder change-over member formed with a telescope finder opening to be movable with respect to a standard finder opening formed on a camera case.

The interlock mechanism may comprise a drive spring for driving the movable mirror to either one of the first position or the second position, an engagement member for moving the movable mirror to the first or second position against the drive spring in interlocking with the change-over operation of the finder change-over member in the finder change-over mechanism, and locking means for locking the finder change-over member at a change-over position.

With the above arrangement, there is provided a change-over member for changing over, for example, between the telescope finder opening also functioning as a field mask and the standard finder opening, one of the finder opening being selected by sliding the change-over member. Then, the movable mirror is moved to the first or second position in interlocking with the change-over operation of the finder change-over member. When the finder is changed over to the telescope aperture, for example, the movable mirror is moved to the first position. On the other hand, when the finder is changed over to the standard aperture, the movable mirror is moved to the second position. Here, the fixed mirror is located at a position for reflecting the image light from the telescope lens section to the movable mirror, and the reflected light from the fixed mirror is directed to the film at the first position of the movable mirror.

Accordingly, the image light captured by the telescope lens section reaches the film through the fixed mirror, and the movable mirror at the first position. In this case, the image light captured by the standard lens is shielded by the movable mirror at the first position (on the rear surface). On the other hand, when the movable mirror is moved to the second position, the shielding state by the rear surface of the movable mirror is released, and the image light captured by the standard lens is directly directed to the film. In such case, the image light from the telescope lens is shielded by the movable mirror.

BRIEF DESCRIPTION OF THE DRAWINGS

FIGS. 6 (A) is the arrangement of a shutter blade in FIG. 1 and its associated components;

FIG. 6 (B) is the operating state of the shutter blade in FIG. 6 (A).

FIG. 7 (A) is the arrangement of a drive lever in FIG. 1 and its associated components; and FIG. 7 (B) is the operating state of the drive lever in FIG. 7 (A).

DESCRIPTION OF THE PREFERRED EMBODIMENTS

Figure 1:
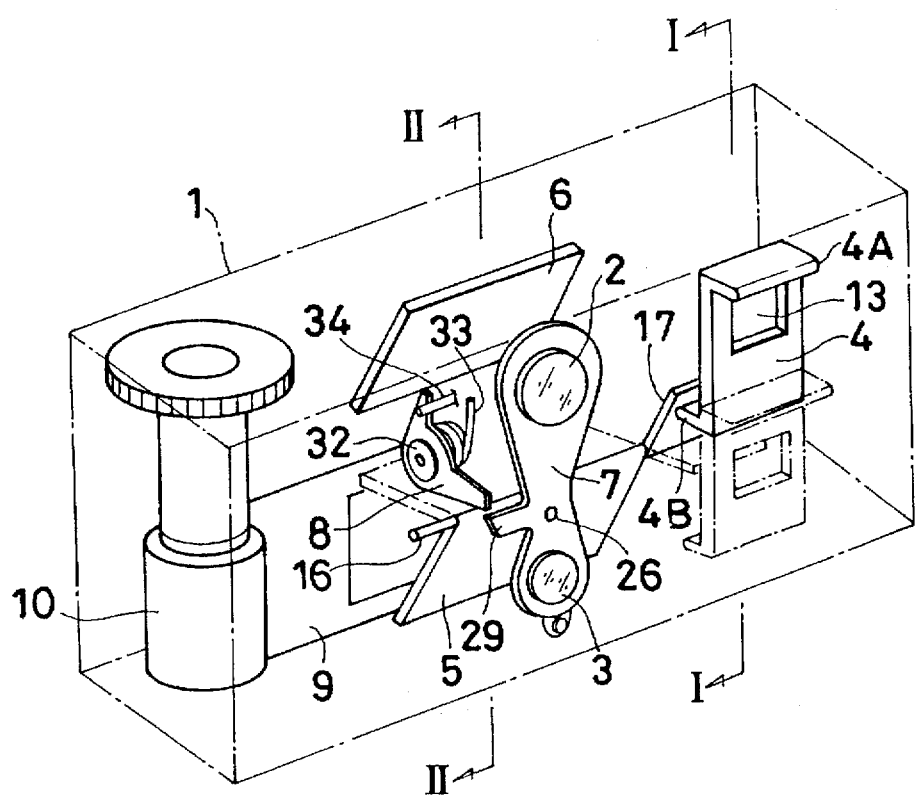
FIG. 1 is a perspective view illustrating the entire arrangement of a dual-focus change-over camera according to an embodiment of the present invention.

FIG. 1 shows the entire arrangement of a dual-focus change-over camera according to an embodiment, while FIGS. 2–7 show the arrangement of each component. This camera is used as a lens-fitted photographic film unit. Referring to FIG. 1, a body case 1 is formed in a thin box made of plastics. On the front of the body case 1, a telescope lens 2 as the shooting lens section is mounted on the upper section, and a standard lens section is mounted on the lower section. Used as the standard lens 3 is a lens with focal distance similar to that used in a conventional lens-fitted photographic film unit. Used as the telescope lens 2 is a lens with longer focal distance than that of the standard lens 3. In the camera of this example, the aperture of lens serves as a diaphragm, and the aperture diameter is arranged in a ratio corresponding to the ratio of focal distances to match the F values of the telescope and standard lenses (telescope aperture diameter: standard aperture diameter=telescope focal distance: standard focal distance).

Furthermore, on the right side of the body case 1 in the figure, there are provided a finder change-over member 4, a movable mirror 5 moved between two positions (first and second positions) by the finder change-over member 4, and a fixed mirror 6 for directing image light from the telescope lens 2 to the movable mirror 5. In addition, behind the telescope lens 2 and the standard lens 3, there are disposed a shutter blade 7, and a drive lever 8 for driving the shutter blade 7. On the left side of the body case 1 in the figure, there is provided a winding shaft 10 for winding a film 9.

Figure 2:
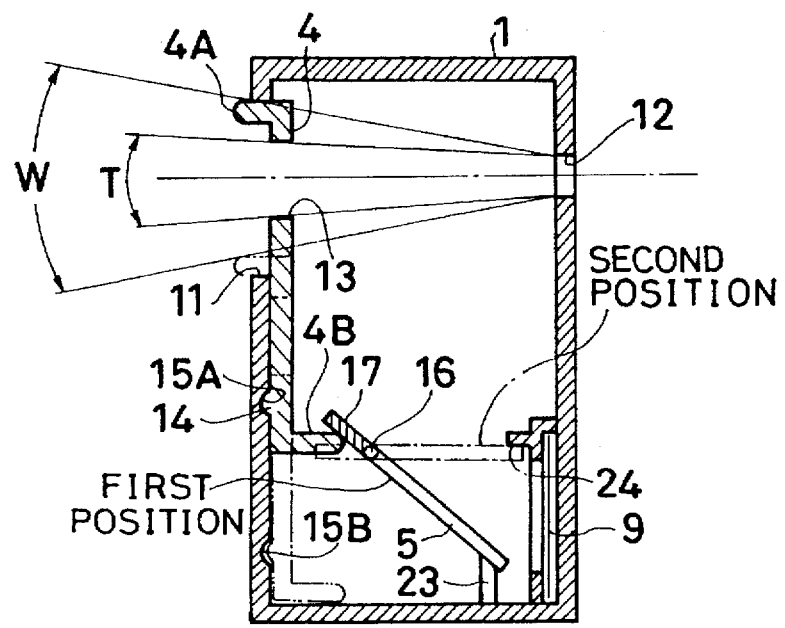
FIG. 2 is a sectional view of the camera in FIG. 1 taken along line I—I.

Referring to FIG. 2, there is shown a sectional view of the camera in FIG. 1 taken along line I—I. As shown, a standard finder opening 11 is formed in the front panel of the body case 1, while an eyepiece opening 12 is formed in the rear panel. These finder openings 11 and 12 are arranged to capture an object with standard field angle. The finder change-over member 4 is disposed behind the standard finder opening 12, and has projected tabs 4A and 4B at its upper and lower ends. It is also formed with a telescope finder opening 13 in its upper section. It is arranged to be vertically slidable, and to be fixed at its uppermost or lowermost position. As fixing means, a projection 14 is provided on the finder change-over member 4, and recesses 15A and 15B are provided in predetermined positions inside the body case 1.

Figure 3A:
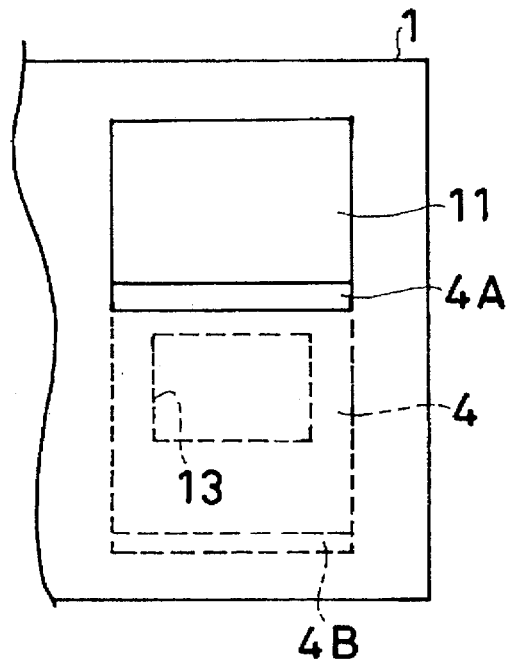
FIGS. 3 (A) and (B) are views illustrating changing-over of finder opening in FIG. 1.
Figure 3B:
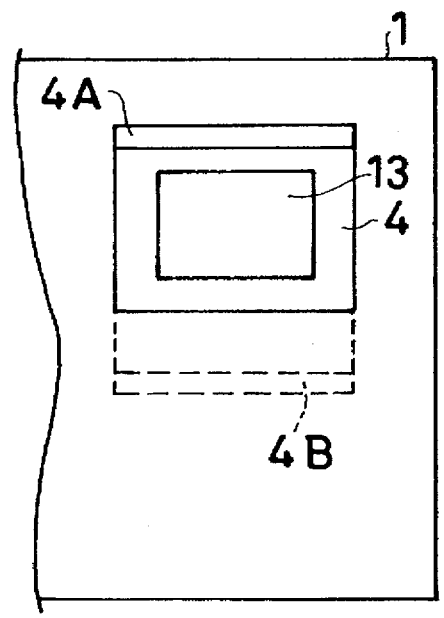

With the above arrangement, when the projected tab 4A of the finder change-over member 4 is pulled down with a finger, and the projection 14 fits in the recess 15A, the finder change-over member 4 is fixed at the lowermost position so that the standard photographing state is established. In this standard photographing state, as shown in FIG. 3 (A), the standard finder opening 11 is set, whereby a range W shown in FIG. 2 is captured through the eyepiece opening 12. Then, when the projected tab 4A of the finder change-over member 4 is pulled up with a finger, and the projection 14 fits in the recess 15A, the finder change-over member 4 also serving as the field mask is fixed at the uppermost position so that the telescope photographing state (field angle) is established. In this telescope photographing state, as shown in FIG. 3 (B), the telescope finder opening 13 is set, whereby the range T (range T>range W) shown in FIG. 2 is captured through the eyepiece opening 12.

Furthermore, the movable mirror 5 is mounted on a support to be rotatable around a shaft 16. The movable mirror 5 is provided with an engagement plate 17 for rotating the movable mirror 5 in interlocking with the operation of the finder change-over member 4. That is, as described above, the movable mirror 5 is rotated as the projected tab 4B formed on the lower end of the finder change-over member 4 engages the engagement plate 17.

Figure 4:
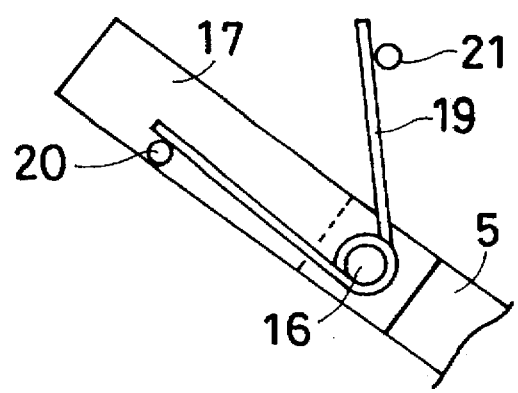
FIG. 4 is a side view showing the arrangement of a movable mirror and a drive spring.

In addition, as shown in FIG. 4, the shaft 16 of the movable mirror 5 is mounted with the drive spring 19, one end of which is locked on a locking pin 20 on the engagement plate 17, and the other end of which is locked on a locking pin 21 disposed on the body case 1. Furthermore, as shown in FIG. 2, a stopper 23 is provided on the bottom of the body case 1 for locking the movable mirror 5 at the first position (telescope position), and a stopper 24 is provided on the rear panel for locking the movable mirror 5 at the second position (standard position).

Figure 5A:
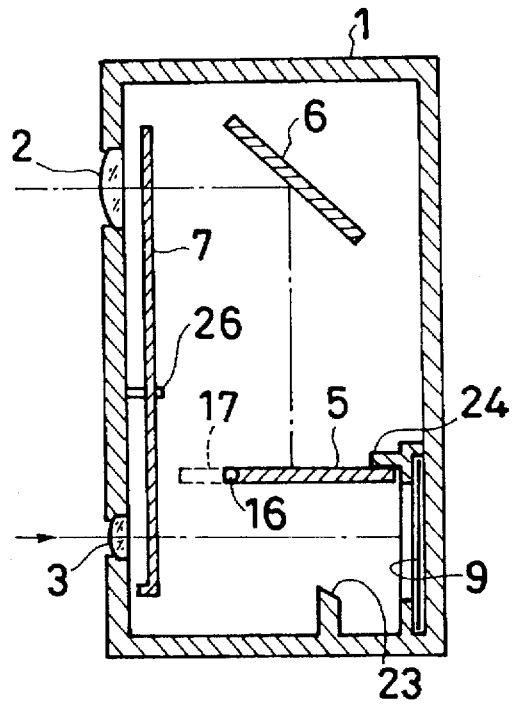
FIGS. 5 (A) and (B) are sectional views of the camera in FIG. 1 taken along line II—II showing states in standard photographing and telescope photographing, respectively.
Figure 5B:
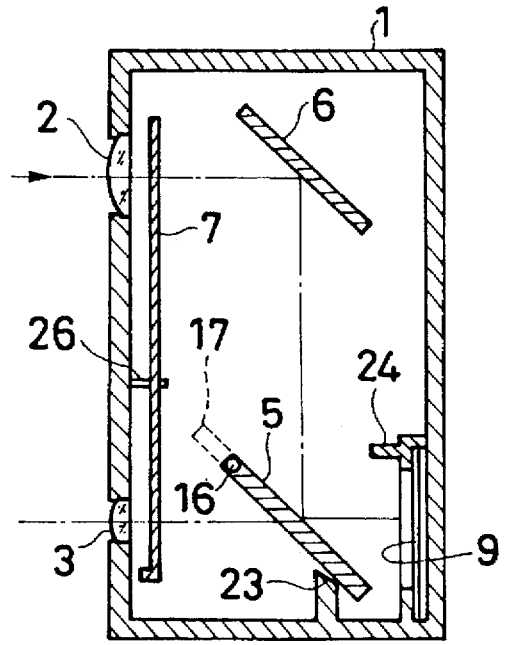

FIGS. 5 (A) and (B) show sectional views of the camera in FIG. 1 taken along line II—II at the mirror and the lens. FIG. 5 (A) is the state of standard photographing state (second position), while FIG. 5 (B) is that of telescope photographing state (first position). In the standard photographing state of FIG. 5 (A), since the movable mirror 5 is locked by the locking pin 24 on the rear panel, and positioned at the second position, the image light entering through the telescope lens 2 is shielded by the movable mirror 5, and only the image light entering through the standard lens 3 can be directed to the film 9. Moreover, in the telescope photographing state of FIG. 5 (B), since the movable mirror 5 is locked by the stopper 23 on the bottom, and positioned at the first position, the image light entering through the standard lens is shielded by the rear surface of the movable mirror 5, and only the image light entering through the telescope lens 2 can be directed to the film 9.

FIGS. 6 (A) and (B) show the detailed arrangement of the shutter blade 7 shown in FIG. 1, while FIGS. 7 (A) and (B) show the detailed arrangement of the drive lever 8. Referring to FIG. 6 (A), the shutter blade 7 of the embodiment is in a form in which both shutter blades for the telescope lens 2 and the standard lens 3 are integrally formed, and mounted on a shaft 26 to be rotatable therearound. In addition, the shutter blade 7 is urged clockwise in the figure by a return spring 27, and restricted for its clockwise rotation by a stopper 28. Then, formed near the shaft 26 of the shutter blade 7 is a projected piece 29 to which the drive lever 8 to be described later contacts.

A weight 30 for adjusting mass balance is mounted on the lower end of the shutter blade 7. That is, in this embodiment, since the diaphragm aperture of the telescope lens 2 is larger than that of the standard lens 3, it is required to make the amount of rotation of the shutter blade 7 at the telescope lens 2 larger than that of the shutter blade 7 at the standard lens 3. Accordingly, the shutter blade 7 is arranged so that, as shown in FIG. 6, distance D1 between the shaft 26 and the center of the telescope lens 2 is larger than distance D2 between the shaft 26 and the standard lens 3 (D1>D2).

However, with such arrangement, the shutter blade at the standard lens 3 is lighter than that at the telescope lens 2 so that the balance is lost. Then, the weight 30 is mounted on the shutter blade at the standard lens 3, whereby the balance is kept between both blades when they are rotated to assure the stable shutter operation.

Referring to FIG. 7 (A), a coil spring 33 is mounted around a shaft 32 of the drive lever 8. The coil spring 33 is urged to rotate the drive lever 8 in the direction indicated by an arrow in FIG. 7 (B). The projected piece 29 of the shutter blade 7 engages one end 8A of the drive lever 8, and a release member 34 vertically rocking to perform a release operation engages the other end 8B. That is, the release member 34 engages the other end 8B when the drive lever 8 accumulates driving force, and the end 8A kicks the projected piece 29 of the shutter blade 7 with the urging force of the coil spring 33 when the release member 34 moves upward in interlocking with the operation of a shooting button.

This embodiment is arranged as above. Its operation is briefly described in the following. First, in performing the standard photographing, as shown in FIG. 3 (A), the finder change-over member 4 also serving as the field mask is slid to the lowermost position, whereby the standard finder opening 11 is established. In this case, since the lower projected tab 4B of the finder change-over member 14 is simultaneously lowered, the movable mirror 5 having the engagement plate 17 engaging the projected tab 4B is rotated upward by the drive spring 19 (FIG. 4), and moved to the second position positioned by the stopper 24 as shown in FIG. 5 (A).

Therefore, in the standard photographing, a state is established where an object at a standard distance can be positioned by the finder opening 11 with range W in FIG. 2, and, as shown in FIG. 5 (A), the image light from the object can be directed to the film 9 through the standard lens 3. Here, as shown in FIG. 5 (B), the image light entering through the other telescope lens 2 is shielded by the mirror surface of the movable mirror 5.

On the other hand, in the telescope photographing, as shown in FIG. 3 (B), the finder change-over member 4 is slid upward to the uppermost position, whereby the telescope finder opening 13 is established. In this case, with the operation of the projected tab 4B of the finder change-over member 14, the movable mirror 5 is rotated downward against the urging force of the drive spring 19, whereby, as shown in FIG. 5 (B) the movable mirror 5 is moved to the first position positioned by the stopper 23.

Therefore, in the telescope photographing, a state is established where an object with a narrower field angle can be positioned by the finder opening 13 with range T in FIG. 2, and, as shown in FIG. 5 (B), the image light from the object can be directed to the film 9 through the telescope lens 2. Here, the image light entering through the other standard lens 3 is shielded by the rear surface of the movable mirror 5.

Then, actual photographing is performed by driving the shutter blade 7 with the shooting button. That is, as shown in FIG. 7 (A), prior to photographing, the driving force of the drive lever 8 is charged by the coil spring 33, and, when the release member 34 moves upward in interlocking with the pressing operation of the shooting button, the drive lever 8 immediately rotates clockwise in the figure as shown in FIG. 7 (B) as the other end 8B of the drive lever 8 is released.

Then, one end 8A of the drive lever 8 kicks the projected piece 29 of the shutter blade 7 in the state of FIG. 6 (A), whereby the shutter blade 7 rotates to the state of FIG. 6 (B) to open the apertures of the telescope lens 2 and the standard lens 3. Thereafter, the shutter blade 7 is returned to its original position by the return spring 27 thereby completing the shutter operation. After the photographing, the drive lever 8 returns to its original position shown in FIG. 7 (A) in interlocking with the winding operation of the film 9.

Although the embodiment is described for setting dual-focus of standard and telescope photographing, dual focus may be set for standard and wide angle (closed) photographing, or telescope and wide angle (closed) photographing.

As described above, since the present invention is arranged so that the image light from one of shooting lens sections is directed by the fixed and movable mirrors in interlocking with the operation of the finder change-over member, and the image light from the other shooting lens section is directed to the film, it is possible to attain dual-focus photographing such as telescope and standard photographing, or standard and wide angle photographing with a simple construction, so that a dual focus camera can be manufactured with an inexpensive, small size and light weighted lens-fitted photographic film unit.

What is claimed is:

1. A dual-focus change-over camera comprising:

a finder change-over mechanism for establishing a dual-focus finder opening for dual-focusing;

two lens shooting sections for dual-focusing;

a fixed mirror for reflecting light from one shooting lens section of said dual-focus shooting lens sections; and a movable mirror movable between a first position for directing the image light reflected by said fixed mirror to a film, and a second position for directing image light from the other shooting lens section to the film;

wherein said finder change-over mechanism includes a finder change-over member formed with a telescope opening to be movable with respect to a standard finder opening formed on a camera case.

2. A dual-focus change-over camera as set forth in claim 1 further comprising an interlock mechanism for moving said movable mirror between said first position and said second position in interlocking with said finder change-over mechanism.

3. A dual-focus change-over camera as set forth in claim 1, wherein shutters of said two shooting lens sections for dual-focusing are coupled to constitute one shutter blade, said coupled shutter blade being rotated around a shaft for shutter operation.

4. A dual-focus change-over camera as set forth in claim 1, wherein said shutter blade is provided with weight for adjusting balance.

5. A dual-focus change-over camera comprising:

a finder change-over mechanism for establishing a dual-focus finder opening for dual-focusing;

two lens shooting sections for dual-focusing;

a fixed mirror for reflecting light from one shooting lens section of said dual-focus shooting lens sections; and a movable mirror movable between a first position for directing the image light reflected by said fixed mirror to a film, and a second position for directing image light from the other shooting lens section to the film; wherein said interlock mechanism comprises a drive spring for driving said movable mirror to either one of the first position or the second position;

an engagement member for moving said movable mirror to said first or second position against the drive spring in interlocking with said change-over operation of said finder change-over member in said finder change-over mechanism; and locking means for locking said finder change-over member at a change-over position.

6. A dual-focus change-over camera as set forth in claim 5 further comprising an interlock mechanism for moving said movable mirror between said first position and said second position in interlocking with said finder change-over mechanism.

7. A dual-focus change-over camera as set forth in claim 5, wherein shutters of said two shooting lens sections for dual-focusing are coupled to constitute one shutter blade, said coupled shutter blade being rotated around a shaft for shutter operation.

8. A dual-focus change-over camera as set forth in claim 5, wherein said shutter blade is provided with weight for adjusting balance.

9. A dual-focus change-over camera as set forth in claim 5, wherein said finder change-over mechanism includes a finder change-over member formed with a telescope finder opening to be movable with respect to a standard finder opening formed on a camera case.

* * * * *